Patented June 24, 1930

1,767,667

UNITED STATES PATENT OFFICE

JAMES M. GRAY, OF WEBSTER GROVES, MISSOURI

GERMICIDAL COMPOUND

No Drawing.   Application filed October 11, 1926.  Serial No. 141,036.

This invention relates to, and has for its object the provision of, a certain new and useful germicidal compound especially adapted for use in the remedial treatment of germ diseases particularly of the gums and teeth.

My germicidal compound, which is the successful result of a discovery, followed by many subsequent clinical tests and experiments, includes in its composition as original ingredients halides of zinc, such as zinc iodide, iodine (resublimed), menthol, glycerin, ethyl alcohol, and water, preferably distilled, and in approximately the following proportions, namely,

| | |
|---|---|
| Zinc iodide | 150 grams |
| Iodine (resublimed) | 250 grams |
| Menthol | 3.2 grams |
| Glycerin | 500 c. c. |
| Water, preferably distilled | 100 c. c. |
| Alcohol, q. s. | 1000 c. c. |

In the production of the final applicable compound, I preferably place the zinc iodide in a flask having a capacity of approximately 500 c. c. and add thereto the total amount of the iodine and approximately 300 c. c. of the glycerine. The flask with its contents is then subjected to the heat of a water-bath, the temperature throughout such heating, which usually, to effect complete solution, consumes from fifteen to thirty minutes, being carefully maintained to below 40° C. I so obtain a solution of iodine in glycerin, and I might state here that the heating of the flask is carried on with care, as too much heat would result in the volatilization of the iodine and consequently produce a resulting product of variable and indefinite composition.

The flask and its contents are then permitted to cool to a temperature of approximately 25° C., when the flask-contents are placed in a suitable receptacle. The flask is then rinsed with approximately 100 c. c. of the alcohol and then emptied into such receptacle, and to the contents of the receptacle I then add the balance of the glycerin, together with the water and menthol, the latter previously combined in solution with the remainder of the alcohol in such quantity, so that the total volume of the mass is then approximately 1000 c. c. The resulting product is a fluid mixture of very dark brown color including in solution the zinc iodide and iodine (resublimed), combined with the gylcerin, menthol, water and alcohol.

Now to complete the compound, which in practice is locally applied to and upon the affected part or parts, a sufficient amount of such fluid mixture is mixed with a correspondingly sufficient amount of anhydrous salts of copper, such as and preferably anhydrous copper sulphate, commonly known as blue vitriol, the latter being in a preferably very finely divided or pulverized state, approximately of 200 mesh, and I thereby provide the finished applicable compound, which is in the form of a paste of creamy consistency, which is then promptly, before any great chemical reaction occurs, suitably applied upon the diseased gum or tissue or other affected part.

The compound in its applicable pasty form has a combined germicidal, stimulative, and astringent effect and, from use and practice, has been found highly efficacious in the remedial treatment of especially various gum and mouth diseases.

I am aware that equivalents of the various ingredients or constituents and also changes in the relative proportions of the several ingredients or constituents of my compound may be made and substituted for those herein stated without departing from the nature and priniciple of my invention.

Having thus described my invention, what I claim and desire to secure by Letters Patent is:

1. A germicidal compound of the class described, the same comprising zinc iodide in solution with glycerin, combined with anhydrous copper sulphate.

2. A germicidal compound of the class described, the same comprising zinc iodide and iodine (resublimed) in solution with glycerin, combined with anhydrous copper sulphate.

3. A germicidal compound of the class described, the same comprising zinc iodide and iodine (resublimed), in solution with glycerin, menthol, and alcohol, combined with anhydrous copper sulphate.

4. A germicidal compound of the class described, the same comprising zinc iodide and iodine (resublimed), in solution with menthol, glycerin, water, and ethyl alcohol, combined with anhydrous copper sulphate finely pulverized to 200 mesh.

5. A germicidal compound in the applicable form of a paste of creamy consistency formed of zinc iodide and iodine (resublimed) in solution with glycerin mixed with anhydrous copper sulphate.

6. A germicidal compound in the applicable form of a paste of creamy consistency formed of zinc iodide and iodine (resublimed) in solution with menthol, glycerin, alcohol, and water, mixed with anhydrous copper sulphate.

7. A medicinal preparation comprising a solution of zinc iodide, resublimed iodine, glycerine, water and alcohol, mixed with copper sulfate.

8. A medicinal preparation in the applicable form of a paste of creamy consistency comprising a solution of zinc iodide, resublimed iodine, water, and alcohol mixed with copper sulfate finely pulverized to 200 mesh.

In testimony whereof, I have signed my name to this specification.

JAMES M. GRAY.